(12) United States Patent
Zhang et al.

(10) Patent No.: US 8,964,318 B2
(45) Date of Patent: Feb. 24, 2015

(54) PRISM SHEET AND DISPLAY DEVICE

(75) Inventors: Minghui Zhang, Beijing (CN); Ning Sun, Beijing (CN); Zhishuai Jia, Beijing (CN); Jie Liu, Beijing (CN); Yihong Ma, Beijing (CN)

(73) Assignees: BOE Technology Group Co., Ltd., Beijing (CN); Bejing BOE Display Technology Co., Ltd., Beijing (CN)

( * ) Notice: Subject to any disclaimer, the term of this patent is extended or adjusted under 35 U.S.C. 154(b) by 33 days.

(21) Appl. No.: 13/701,644

(22) PCT Filed: Jul. 20, 2012

(86) PCT No.: PCT/CN2012/078929
§ 371 (c)(1),
(2), (4) Date: Dec. 3, 2012

(87) PCT Pub. No.: WO2013/013597
PCT Pub. Date: Jan. 31, 2013

(65) Prior Publication Data
US 2013/0222931 A1    Aug. 29, 2013

(30) Foreign Application Priority Data
Jul. 28, 2011 (CN) .................. 2011 2 0271641 U

(51) Int. Cl.
*G02B 5/04* (2006.01)
*G02B 5/02* (2006.01)
(52) U.S. Cl.
CPC ............... *G02B 5/04* (2013.01); *G02B 5/0231* (2013.01); *G02B 5/0268* (2013.01); *G02B 5/0278* (2013.01)
USPC ...................................................... 359/837
(58) Field of Classification Search
None
See application file for complete search history.

(56) References Cited

U.S. PATENT DOCUMENTS 5,422,756 A    6/1995   Weber
5,833,344 A    11/1998  Arai et al.
(Continued)

FOREIGN PATENT DOCUMENTS

CN    1908753 A    2/2007
CN    101034170 A  9/2007
(Continued)

OTHER PUBLICATIONS

International Search Report mailed Nov. 22, 2012; PCT/CN2012/078929.
(Continued)

*Primary Examiner* — Jade R Chwasz
(74) *Attorney, Agent, or Firm* — Ladas & Parry LLP

(57) ABSTRACT

The present invention discloses a prism sheet and a display device comprising the prism sheet for improving performances of a backlight module in a liquid crystal display device. The prism sheet comprises a first substrate and a second substrate, wherein the first substrate comprises a first surface and a second surface opposite to the first surface, and the second surface comprises a plurality of first protrusions arranged in parallel along a first direction; the second substrate comprises a third surface and a fourth surface opposite to the third surface, the third surface comprises a plurality of second protrusions arranged in parallel along the first direction, and the fourth surface comprises a plurality of third protrusions arranged in parallel along a second direction; and the second surface and the third surface are joined by meshing of the first protrusions with the second protrusions.

20 Claims, 2 Drawing Sheets

(56) References Cited

U.S. PATENT DOCUMENTS

| | | | |
|---|---|---|---|
| 6,021,007 A * | 2/2000 | Murtha | 359/834 |
| 7,635,200 B2 | 12/2009 | Atsushi | |
| 2004/0062513 A1 | 4/2004 | Sung et al. | |
| 2007/0030566 A1 | 2/2007 | Chang | |

FOREIGN PATENT DOCUMENTS

| | | |
|---|---|---|
| CN | 202110304 U | 1/2012 |
| CN | 202145235 U | 2/2012 |
| JP | 10-096924 A | 4/1998 |
| JP | 2002-182039 A | 6/2002 |
| JP | 2008-311082 A | 12/2008 |
| KR | 2005/0054605 A | 6/2005 |
| KR | 20060033162 A | 4/2006 |

OTHER PUBLICATIONS

International Preliminary Report on Patentability dated Jan. 28, 2014; PCT/CN2012/078929.

* cited by examiner

PRISM SHEET AND DISPLAY DEVICE

TECHNICAL FIELD

The present invention relates to a technical field of a liquid crystal display (LCD), especially to a prism sheet and a display device.

BACKGROUND

A prism sheet, also called a brightness enhancement film (BEF), is an important component, which occupies 37% of the costs of an LCD backlight module. A prism sheet is a film material, which makes diffused light concentrated within a certain range and emitted by utilizing the law of emission and refraction.

In general, a prism sheet's lower surface is a planar surface, and its upper surface is in a wave structure, that is, it comprises a plurality of protrusions in parallel with one another. Referring to FIG. 1, the prism sheet comprises: a lower surface 10, and an upper surface 20, and the upper surface 20 has a plurality of protrusions 21 thereon in parallel with one another. Herein, the axial cross-sections of the protrusions 21 are isosceles triangles, and moreover, the protrusions 21 are arranged in parallel along a horizontal direction. Certainly, the protrusions 21 on the prism sheet also may be arranged in parallel along a perpendicular direction.

In an LCD backlight module, light generated by a plurality of light sources, after being diffused through a diffusion plate, enters into a prism sheet, in which light is emitted in a certain degree of concentration under the effect of the protrusions parallel with one another on the prism sheet, thereby increasing the brightness of the backlight module within a particular range of viewing angles.

At present, an LCD backlight module comprises a plurality of light sources therein, and these light sources are usually arranged along a set direction. for example, a horizontal direction, a perpendicular direction, or a rectangular array direction. When it is required to concentrate the light emitted from the plurality of light sources in a horizontal direction, a prism sheet having protrusions arranged in parallel along the horizontal direction on its upper surface is used; when it is required to concentrate the light emitted from the plurality of light sources in a perpendicular direction, a prism sheet having protrusions arranged in parallel along the perpendicular direction on its upper surface is used; when it is required to implement light concentration in both of the two directions, two types of prism sheets described above are used simultaneously, which can be specifically referred to FIG. 2, in which two prism sheets are used.

Prism sheets for two directions are required to work in cooperation in order to achieve light concentration in two directions, and in result not only the assembling processes of an LCD backlight module are increased, but also the light concentration effect will not be changed when movement of the two prism sheets occurs, and further the performances of the LCD backlight module is affected. Therefore, the existing backlight module needs enough space to accommodate the two prism sheets, which makes the backlight module relatively thick and reliability not high.

SUMMARY

The embodiments of the present invention provide a prism sheet and a display device, for improving performances of a backlight module in a liquid crystal display device.

An embodiment of the present invention provides a prism sheet, which comprises a first substrate and a second substrate, wherein the first substrate comprises a first surface and a second surface opposite to the first surface, and the second surface comprises a plurality of first protrusions arranged in parallel along a first direction;

the second substrate comprises a third surface and a fourth surface opposite to the third surface, the third surface comprises a plurality of second protrusions arranged in parallel along the first direction, and the fourth surface comprises a plurality of third protrusions arranged in parallel along a second direction; and the second surface and the third surface are joined by meshing of the first protrusions with the second protrusions.

Another embodiment of the present invention provides a display device, which comprises the prism sheet described above.

DETAILED DESCRIPTION OF THE PREFERRED EMBODIMENTS

In an embodiment of the present invention, a prism sheet is constituted with two types of substrates with different refractive indices; and moreover, protrusions on the light-emitting surfaces of the two types of substrates have different arrangement directions, which can concentrate light in two different directions.

Figure 1:
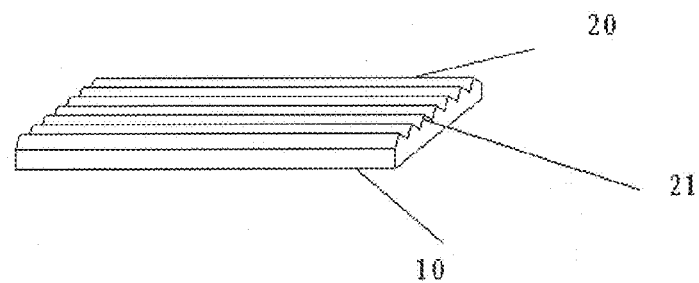
FIG. 1 is a schematic structural view of a prism sheet in the prior art.
Figure 2:
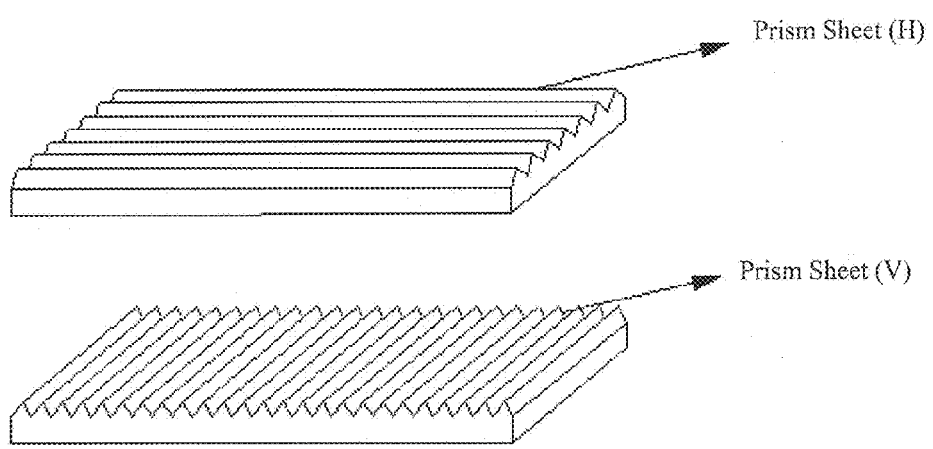
FIG. 2 is a schematic view of two prism sheets used in lamination in the prior art.
Figure 3:
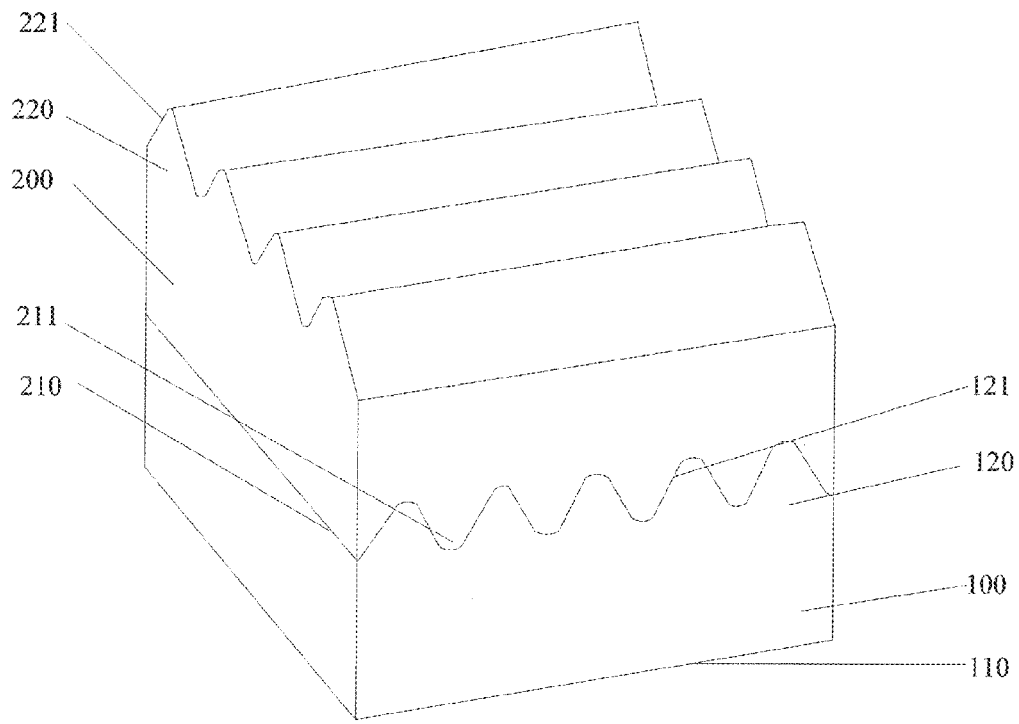
FIG. 3 is a schematic structural view of a prism sheet in an embodiment of the present invention.

Referring to FIG. 3, in this embodiment of the present invention, a prism sheet comprises a first substrate 100 and a second substrate 200.

The first substrate 100 comprises a first surface 110 and a second surface 120, while the first surface 110 and the second surface 120 are opposite to each other. The second surface 120 comprises a plurality of first protrusions 121 arranged in parallel along a first direction.

The second substrate 200 comprises a third surface 210 and a fourth surface 220 opposite to the third surface 210, the third surface 210 comprises a plurality of second protrusions 211 arranged in parallel along the first direction, and the fourth surface 220 comprises a plurality of third protrusions 221 arranged in parallel along a second direction.

The second surface 120 and the third surface 210 are joined together by meshing of the first protrusions 121 with the second protrusions 211.

After the second surface 120 meshes with the third surface 210, joint between the first substrate 100 and the second substrate 200 is realized, thus forming a prism sheet.

After a prism sheet is formed, when the refractive index of the first substrate 100 is equal to the refractive index of the second substrate 200, the prism sheet can only concentrate light in one direction, that is, it can only concentrate light in the second direction. Therefore, in the present invention, the refractive indices of the first substrate 100 and the second substrate 200 are different, and the refractive index of the first substrate 100 is larger than that of the second substrate 200.

Thus, when light is passing through the first substrate 100, since the refractive index of the first substrate 100 is larger than that of the second substrate 200, when the light enters into the second substrate, an effect of light concentration will be generated, forming light concentration of first time in the first direction. Because the refractive index of the second substrate 200 is larger than that of air, when the light is emitted from the prism sheet, light concentration of second time in the second direction is formed.

In the embodiment described above, the first direction is a horizontal direction, and the second direction is a perpendicular direction. However, the present invention is not limited to this, and instead, the first direction, as well as the second direction, may be set depending on different arrangements of a plurality of light sources in the LCD backlight module. Generally, the first direction and the second direction form an angle that is greater than 0° and less than 180°. Preferably, the first direction and the second direction form an angle of 90°.

In the embodiment described above, the second surface 120, the third surface 210, and the fourth surface 220 all have protrusions thereon. Since the second surface 120 and the third surface 210 are joined by meshing between the first protrusions 121 and the second protrusions 211, when the shapes of the first protrusions 121 are the same as the those of the second protrusions 211, a full meshing between the first protrusions 121 and the second protrusions 211 can be achieved, and accordingly a seamless joint of the second surface 120 and the third surface 210 can be realized. Certainly, the shapes of the first protrusions 121 may not be exactly same as those of the second protrusions 211, and consequently the first protrusions 121 and the second protrusions 211 may not mesh fully therebetween, so that gaps exist between the second surface 120 and the third surface 210, but these gaps do not affect the use of the prism sheet.

The shapes of the third protrusions 221 may be different from or may be the same as the shapes of the second protrusions 211, and may be different from or may be the same as the shapes of the first protrusions 121. The axial cross-sections of these protrusions are usually polygons. In the embodiment described above, the axial cross-sections of the first protrusions 121, the second protrusions 211 and the third protrusions 221 are all isosceles triangles; however, the embodiments of the present invention are not limited to this, and other polygons also may be used. For example, the axial cross-sections of the first protrusions 121 and the second protrusions 211 are triangles, and the axial cross-sections of the third protrusions 221 are pentagons.

In the embodiment described above, when the axial cross-sections of the first protrusions 121, the second protrusions 211 and the third protrusions 221 are all isosceles triangles, in order to realize meshing between the first protrusions 121 and the second protrusions 211 and reduce friction between the two substrates, preferably, the vertex angles in the axial cross-sections of the first protrusions 121 and the second protrusions 211 are generally rounded corners. For example, when the axial cross-sections of the first protrusions 121 and the second protrusions 211 are all isosceles triangles, the vertex angles thereof are also rounded corners. In this way, scratches between the second surface 120 and the third surface 210 is reduced.

Also, the vertex angles in the axial cross-sections of the third protrusions 221 may be rounded corners, which can reduce damages to the fourth surface 220.

In the embodiment described above, the first surface 110 is a planar surface; however, the embodiments of the present invention are not limited to this, and the first surface 110 also may be a curved surface, such as a concave surface.

The manufacturing processes of the prism sheet described above comprise: the manufacture of the first substrate and the second substrate. Thus, firstly it is to choose two sheet materials with different refractive indices, in which the sheet material with the larger refractive index can be used as the first substrate, and the sheet material with the smaller refractive index can be used as the second substrate. When the first substrate has protrusions only on one side, its manufacturing processes may be in accord with that in the prior art, which forms the first substrate by extruding one side of the sheet material with the larger refractive index through a roller with hob teeth in a first direction. When the first substrate has protrusions on both sides, then the first substrate is formed by extruding one side of the sheet material with the larger refractive index through a roller with hob teeth in a first direction, while extruding the other side of the sheet material with the larger refractive index through a roller with hob teeth in a third direction.

Figure 4:
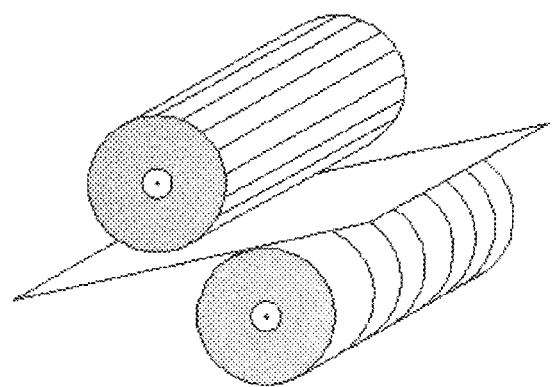
FIG. 4 is a schematic view of extrusion shaping a prism sheet in an embodiment of the present invention.

The second substrate has protrusions on the both sides, and therefore, the second substrate is formed by extruding the third surface through a roller with hob teeth in the first direction, and extruding the fourth surface through a roller with hob teeth in the second direction. A specific forming process may be referred to FIG. 4.

In the procedure of manufacturing a prism sheet as described above, the selected sheet material is formed by injection molding of one or more selected from Poly(methylmethacrylate), Polycarbonate, Polystyrene, and Styrene-Methyl Methacrylate Copolymer. That is, the materials of the substrates in the prism sheet may comprise: one or more selected from Poly(methylmethacrylate), Polycarbonate, Polystyrene, and Styrene-Methyl Methacrylate Copolymer. Therefore, the material of the first substrate 100 or the second substrate 200 comprises: at lease one selected from Poly (methylmethacrylate), Polycarbonate, Polystyrene, and Styrene-Methyl Methacrylate Copolymer.

After the prism sheet described above is manufactured, it may be applied to an LCD backlight module, that is, the prism sheet described above is included in a display device. Certainly, the prism sheet of the embodiment may also be applied to other optical instruments, such as a monochromator.

In the embodiments of the present invention, a prism sheet is constituted by two types of substrates with different refractive indices, and protrusions on the light-emitting surfaces of the two types of substrates have different arrangement directions, which can concentrate light in two different directions, that is, light concentration in two directions can be achieved with one prism sheet. Thus, when it is required to concentrate light in two directions, it can be realized without two prism sheets, but with only one prism sheet according to an embodiment of the present invention. When such a prism sheet is applied to an optical instrument, for example a liquid crystal display device, it can greatly reduce the space to accommodate the prism sheet in the optical instrument, and thus the volume of optical instrument is reduced.

In addition, the vertex angles in the axial cross-sections of two protrusions meshing with each other on the two substrates are rounded corners, which can reduce damages to the joint surfaces, improve performances of the prism sheet, and further improve performances of the optical instrument.

Obviously, the skilled in the art can make various variations and modifications to the present invention, without departure from the spirit and the scope of the present invention. Thus, if the variations and modifications of the present invention fall in the scope of the claims of the present invention and equivalents thereof, then the present invention intends to include these variations and modifications.

The invention claimed is:

1. A prism sheet comprising: a first substrate and a second substrate,
   wherein the first substrate comprises a first surface and a second surface opposite to the first surface, and the second surface comprises a plurality of first protrusions arranged in parallel along a first direction;
   the second substrate comprises a third surface and a fourth surface opposite to the third surface, the third surface comprises a plurality of second protrusions arranged in parallel along the first direction, and the fourth surface comprises a plurality of third protrusions arranged in parallel along a second direction;
   the second surface and the third surface are joined by meshing of the first protrusions with the second protrusions, and
   the third surface and the fourth surface are parallel to each other, and the first direction and the second direction are parallel to the plane of the third and the fourth surfaces and are different from each other.

2. The prism sheet according to claim 1, wherein a refractive index of the first substrate is larger than that of the second substrate.

3. The prism sheet according to claim 2, wherein a material of the first substrate or the second substrate comprises at least one selected from the group consisted of Poly(methylmethacrylate), Polycarbonate, Polystyrene, and Styrene-Methyl Methacrylate Copolymer.

4. The prism sheet according to claim 3, wherein the second substrate is formed by extruding the third surface extruded with a roller having hob teeth along the first direction and extruding the fourth surface extruded with a roller with hob teeth along the second direction.

5. The prism sheet according to claim 1, wherein the first direction and the second direction forms an angle that is greater than 0° and less than 180°.

6. The prism sheet according to claim 1, wherein the axial cross-sections of the first protrusions, the second protrusions, and the third protrusions are polygons.

7. The prism sheet according to claim 6, wherein the vertex angles of the polygon are rounded corners.

8. The prism sheet according to claim 7, wherein a shape of the first protrusions is the same as that of the second protrusions.

9. The prism sheet according to claim 6, wherein a shape of the first protrusions is the same as that of the second protrusions.

10. The prism sheet according to claim 1, wherein the first surface comprises one selected from the group consisted of planar surface and curved surface.

11. The prism sheet according to claim 1, wherein a material of the first substrate or the second substrate comprises at least one selected from the group consisted of Poly(methylmethacrylate), Polycarbonate, Polystyrene, and Styrene-Methyl Methacrylate Copolymer.

12. The prism sheet according to claim 11, wherein the second substrate is formed by extruding the third surface extruded with a roller having hob teeth along the first direction and extruding the fourth surface extruded with a roller with hob teeth along the second direction.

13. A display device, comprising a prism sheet, which comprises a first substrate and a second substrate,
   wherein the first substrate comprises a first surface and a second surface opposite to the first surface, and the second surface comprises a plurality of first protrusions arranged in parallel along a first direction;
   the second substrate comprises a third surface and a fourth surface opposite to the third surface, the third surface comprises a plurality of second protrusions arranged in parallel along the first direction, and the fourth surface comprises a plurality of third protrusions arranged in parallel along a second direction;
   the second surface and the third surface are joined by meshing of the first protrusions with the second protrusions, and
   the third surface and the fourth surface are parallel to each other, and the first direction and the second direction are directions that are parallel to the plane of the third and the fourth surfaces and are different from each other.

14. The display device according to claim 13, wherein a refractive index of the first substrate is larger than that of the second substrate.

15. The display device according to claim 13, wherein the first direction and the second direction forms an angle that is greater than 0° and less than 180°.

16. The display device according to claim 13, wherein the axial cross-sections of the first protrusions, the second protrusions, and the third protrusions are polygons.

17. The display device according to claim 16, wherein the vertex angles of the polygon are rounded corners.

18. The display device according to claim 16, wherein a shape of the first protrusions is the same as that of the second protrusions.

19. The display device according to claim 13, wherein the first surface comprises one selected from the group consisted of planar surface and curved surface.

20. The display device according to claim 13, wherein a material of the first substrate or the second substrate comprises at least one selected from the group consisted of Poly(methylmethacrylate), Polycarbonate, Polystyrene, and Styrene-Methyl Methacrylate Copolymer.

* * * * *